Jan. 22, 1957
C. W. McKINLEY
2,778,446
AIR CLEANER ASSEMBLY
Filed Dec. 30, 1953
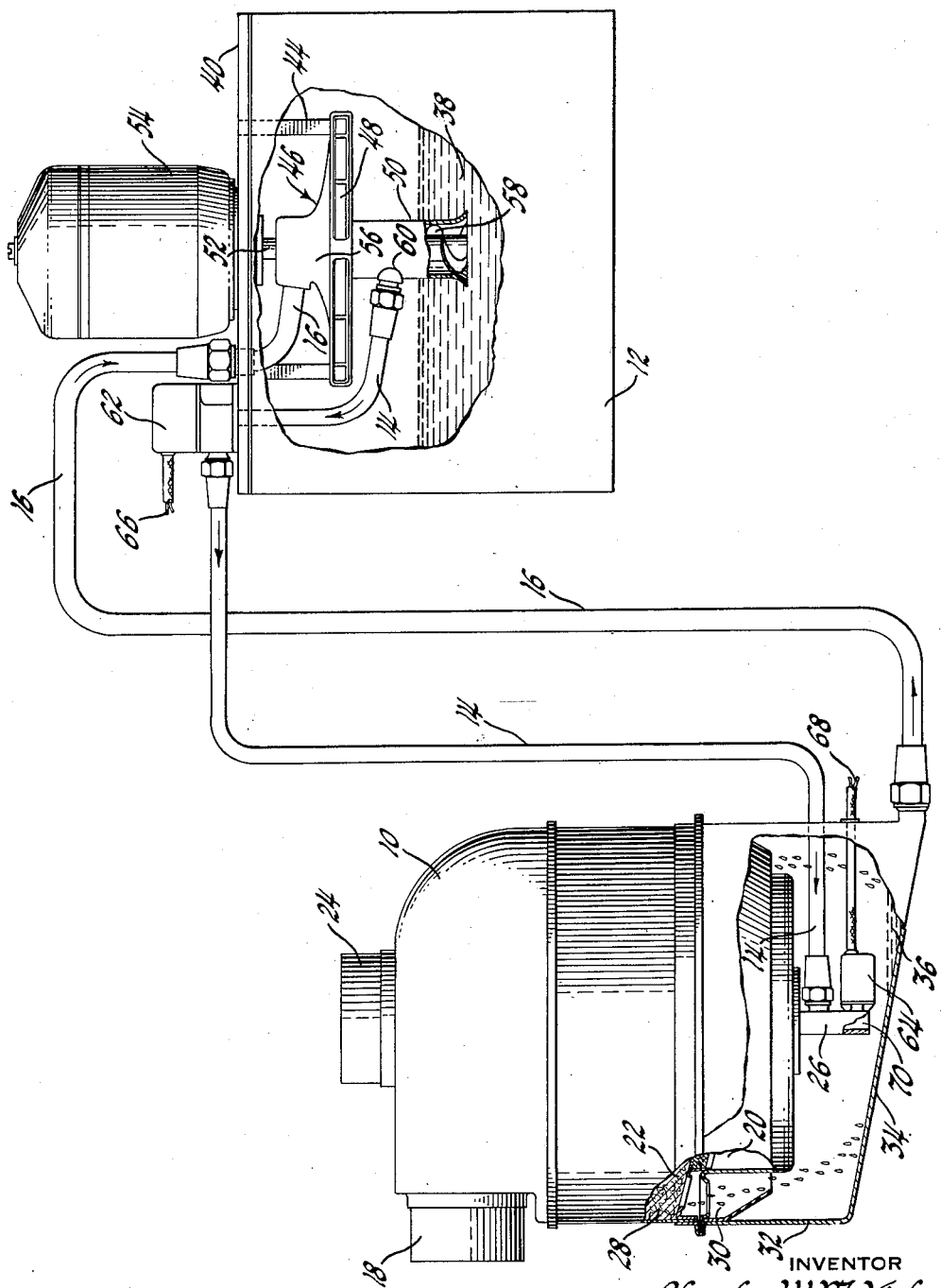
INVENTOR
Charles W. McKinley
BY
L. D. Busch
ATTORNEY

United States Patent Office 2,778,446
Patented Jan. 22, 1957

2,778,446

AIR CLEANER ASSEMBLY

Charles W. McKinley, Flint, Mich., assignor to General Motors Corporation, Detroit, Mich., a corporation of Delaware Application December 30, 1953, Serial No. 401,163

2 Claims. (Cl. 183—14)

This invention relates to air cleaners generally and more particularly to forced feed liquid bath air cleaners and means for circulating liquid through such cleaners.

Heavy duty air induction equipment such as farm machinery, military vehicles and earth moving apparatus which are operated within dust laden and otherwise impure atmospheres require the use of air filtering devices having a large capacity and high efficiency. A forced feed liquid bath air cleaner wherein the liquid is continually recirculated through the air cleaner system is one of the most adaptable air filtering systems for such uses. However, the bulk of such devices often prevents their use within confined areas and requires that separable components be disposed at different locations and be interconnected through fluid flow lines. A further limitation has heretofore been imposed requiring the liquid retaining unit to be disposed below the air cleaning unit to eliminate the use of two fluid pumps and the possibility of clogging the interconnecting fluid flow lines by the settling of foreign matters within such lines from the liquid stagnated therein during periods of inoperation.

It is an object of this invention to provide a forced feed liquid bath air cleaner which may have the liquid retaining unit disposed apart from the air cleaning unit and which is not limited as to the location of such liquid retaining unit with respect to the air cleaning unit.

It is also an object of this invention to provide a forced feed liquid bath air cleaner having the liquid retaining unit disposed apart from the air cleaning unit and disposed at some position above the air cleaning unit. Provision is made whereby the liquid supply and exhaust pumps are combined to eliminate the necessity of two separate pumps.

It is a further object of this invention to provide for the location of a liquid retaining or supply unit above an air cleaning unit and to provide flow lines therebetween which will not become clogged or restricted by the settling of foreign matter within such flow lines. Solenoid valves are provided within the air cleaner assembly to enable closing off the liquid supply line and draining all excess liquid from the cleaner unit and the fluid flow lines to prevent the stagnation of liquid within the air cleaner unit or the flow lines.

In the drawing is shown an embodiment of the present invention with parts broken away to more clearly show certain pertinent structural details.

The air filtering equipment embodied in this invention includes an air cleaning unit 10 and a liquid retaining tank 12 which are interconnected by fluid flow lines 14 and 16. Any conventional forced feed liquid bath air cleaning unit may be employed. In the present instance the air cleaner 10 includes an air inlet conduit 18 through which air is inducted into the cleaner. The air passes through a liquid sump 20 formed in the bottom of the air cleaner, through a maze of filtering material 22 and out the conduit 24 formed in the top of the cleaning unit. Liquid is supplied to the sump 20 through the fluid flow line 14 connected to the liquid tank 12 and to the fitting 26 secured to the bottom of the sump. The air passing through the air cleaner 10 picks up the liquid from the sump 20 and deposits the liquid within the filtering material 22. The wetted filter material removes the impurities entrained in the inducted air. The excess liquid is carried to low pressure areas 28 about the periphery of the air cleaner where the liquid and impurities are gravitationally drained from the cleaning unit through passages 30.

Secured to the bottom of the air cleaner 10, and encompassing the liquid sump 20 and drain passages 30, is a drip pan 32. The bottom plate 34 of the drip pan is sloped downwardly to provide a low area 36 where the liquid drained from the air cleaner 10 may be collected. The fluid flow line 16 is connected to the drip pan 32 adjacent the low area 36 and carries the liquid collected therein to the liquid tank 12.

The tank 12 is adapted to retain a level of liquid within a settling chamber 38 formed therein. A cover member 40 is secured over the tank through which the flow lines 14 and 16 are extended. Disposed within the tank 12 and secured to the underside of the cover 40, as by braces or stays 44, is a multiple pumping unit 46. The pumping unit 46 includes a turbo exhauster pump 48 and a screw type pump 50 both driven by the same shaft 52. A motor 54 is vertically mounted on the cover 40 and adapted to drive the shaft 52 of the pumps 48 and 50. The inlet side 56 of the exhauster pump 48 is connected to fluid flow line 16 for withdrawing liquid from the drip pan 32 and for conveying such liquid to the tank 12. The foreign matter entrained within the liquid received from the air cleaner 10 is allowed to settle out or separate from the liquid within the settling chamber 38 of the tank 12. The more clean liquid near the top of the liquid level covers the inlet side 58 of the screw pump 50. The screw pump 50 is adapted to pull the clean liquid from the top of the liquid level and to convey the same through the fluid flow line 16 connected to the outlet side 60 of the pump.

The air filtering assembly thus far described may be employed with any air induction equipment where the liquid tank 12 may be mounted in a position below the air cleaner unit 10 so that the liquid flowing through flow lines 14 and 16 may gravitationally drain back into the tank when the multiple pump 46 is shut down. In order to enable the use of this assembly in installations where the liquid tank 12 must be located above the air cleaner 10, solenoid type valves 62 and 64 are included within the assemblage.

Solenoid valve 62 is connected within the fluid flow line 14 supplying liquid to the air cleaner unit 10. The valve 62 is electrically connected as by lead 66 to the ignition switch of the air induction device with which the air cleaning assembly is associated. The valve 62 is adapted to close off the fluid flow line 14 and vent the line to atmosphere when the ignition is shut off. The other solenoid valve 64 is secured to the inlet fitting 26 connected to the bottom of the air cleaner 10 and is connected to the ignition switch of the air induction device by lead 68. When the air induction device is shut-off the valve 64 opens the flow passage 70 formed in the fitting 26 and opening into the drip pan 32. Liquid remaining in the fluid line 14 and in the sump 20 is thereby drained into the drip pan 32. The motor 54 continues to drive the multiple pump 46 for a short period after the ignition is cut off in order to exhaust the liquid still in the air cleaner which will collect in the drip pan 32 and the liquid then presently in the drip pan and fluid flow line 16.

When the ignition switch of the air induction device is turned on the solenoid valve 62 is opened and the valve 64 is closed. The drive motor 54 operates the multiple pump 46 causing liquid to be moved through fluid line 14 by the screw pump 50 to the sump 20 of the air cleaner 10. The air inducted through the air cleaner 10 carries the liquid into the filtering material 22 from which it drains through passages 30 to the drip pan 32. The liquid and impurities received from the air filtering material 22 is pulled through fluid line 16 by the exhauster pump 48 to the settling chamber 38 of the tank 12. The foreign matter settles to the bottom of the tank and leaves the more clean liquid near the top for recirculation through the air cleaner.

I claim:

1. An air cleaner assembly comprising a liquid bath air cleaner and a fluid tank adapted to retain a quantity of liquid therein, said tank being disposed in spaced relation apart from said air cleaner, fluid flow lines connected between said tank and said air cleaner, a fluid pump associated with said tank and connected between said flow lines and said liquid, check valves disposed within one of said fluid flow lines at the opposite ends thereof, one of said valves being adapted to close the inlet end of said one line and the other of said valves to open the outlet end of said one line, said pump being operable to supply liquid through said one line and to exhaust fluid from said air cleaner through the other of said lines, and means for simultaneously closing said one valve to prevent fluid flow to said air cleaner and for opening said other valve for draining liquid from said one line during periods of inoperation of said air cleaner assembly.

2. An air cleaner assembly comprising a liquid bath air cleaner and a fluid tank adapted to retain a quantity of liquid therein, said tank being disposed in spaced relation apart from said air cleaner, said air cleaner including a drip pan for collecting excess liquid drained off therefrom, fluid flow lines connected between said tank and said air cleaner, pumping means associated with said tank for passing liquid through said flow lines from said tank to said air cleaner and from said drip pan back to said tank, and operatively interconnected solenoid operated check valves disposed within each end of the one of said flow line supplying liquid to said air cleaner, one of said valves being adapted to stop the flow of liquid to said air cleaner and the other of said valves being adapted to open said flow line for drainage into said drip pan, said check valves being actuated prior to stopping said pumping means and holding while substantially all liquid is removed from said drip pan.

References Cited in the file of this patent

UNITED STATES PATENTS

| | | |
|---|---|---|
| 1,751,999 | Hines | Mar. 25, 1930 |
| 1,860,111 | Miller | May 24, 1932 |
| 2,031,437 | Vincent, Jr. | Feb. 18, 1936 |
| 2,240,042 | Kelsey et al. | Apr. 29, 1941 |